Figure 5:
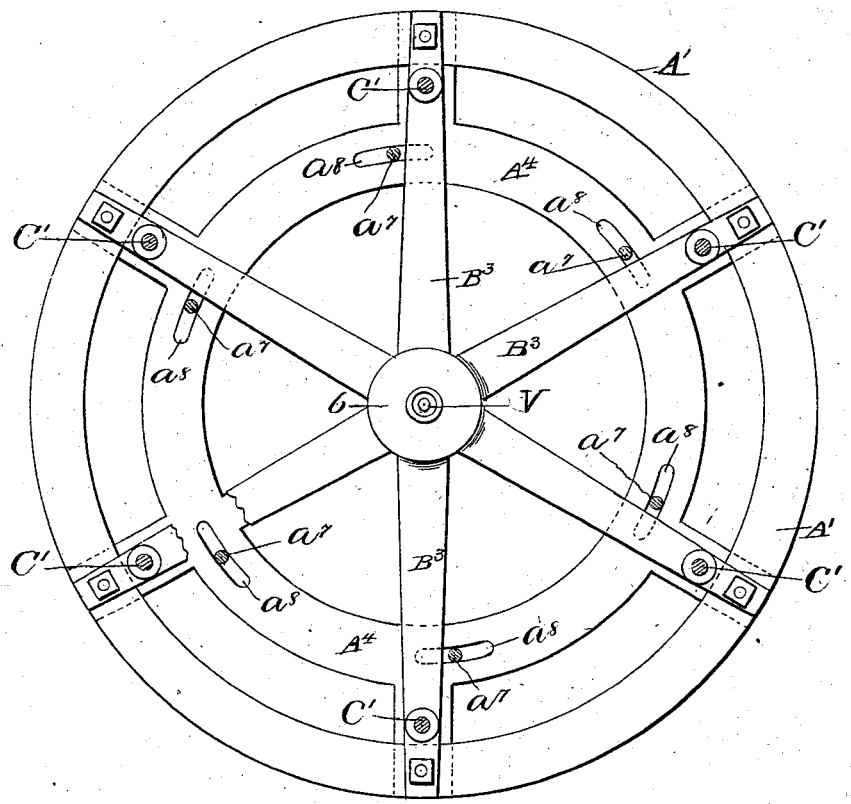

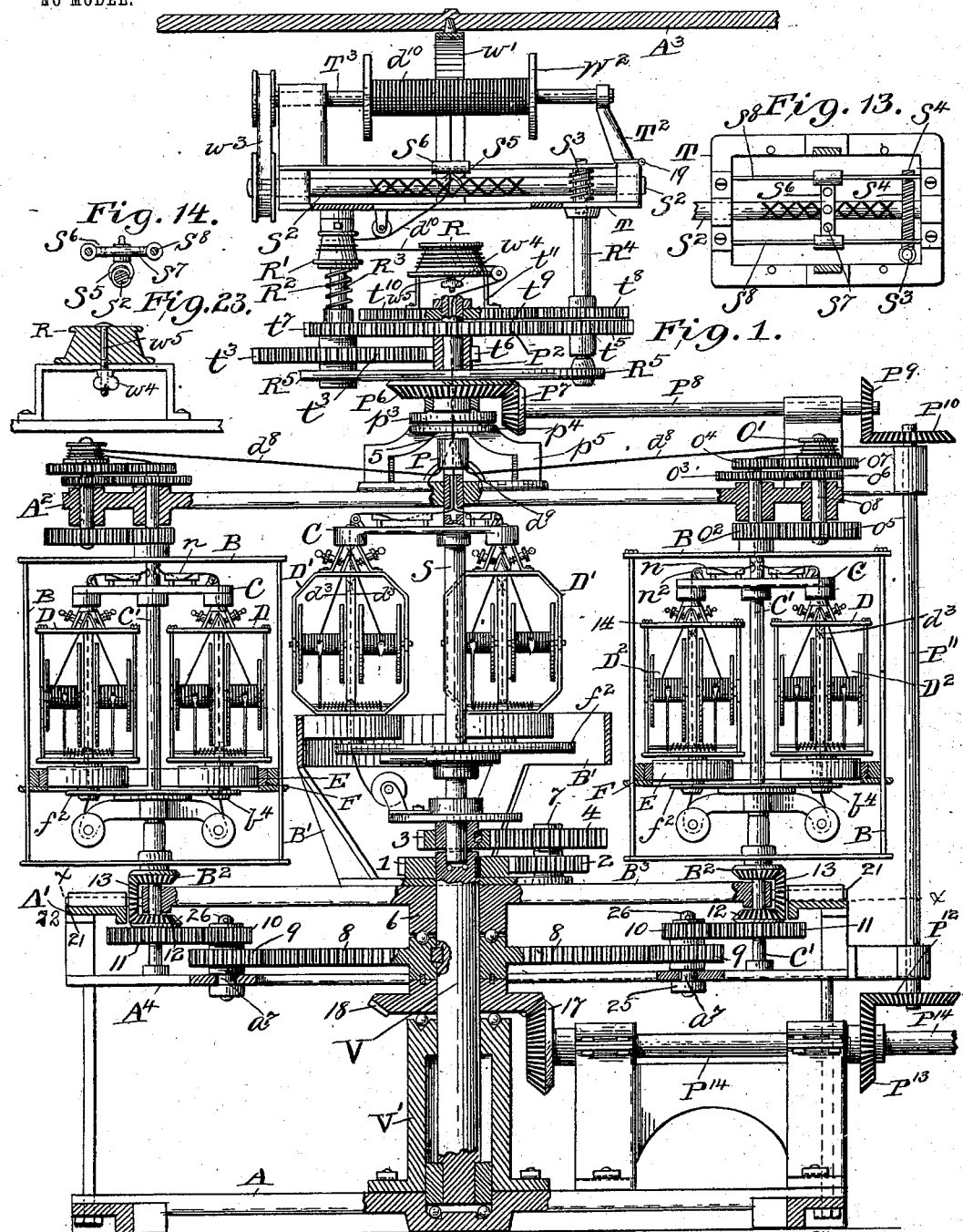

No. 723,806. PATENTED MAR. 31, 1903.
W. H. AVIS.
CORDAGE MACHINE.
APPLICATION FILED JAN. 19, 1899. RENEWED AUG. 30, 1902.
NO MODEL. 7 SHEETS—SHEET 2.
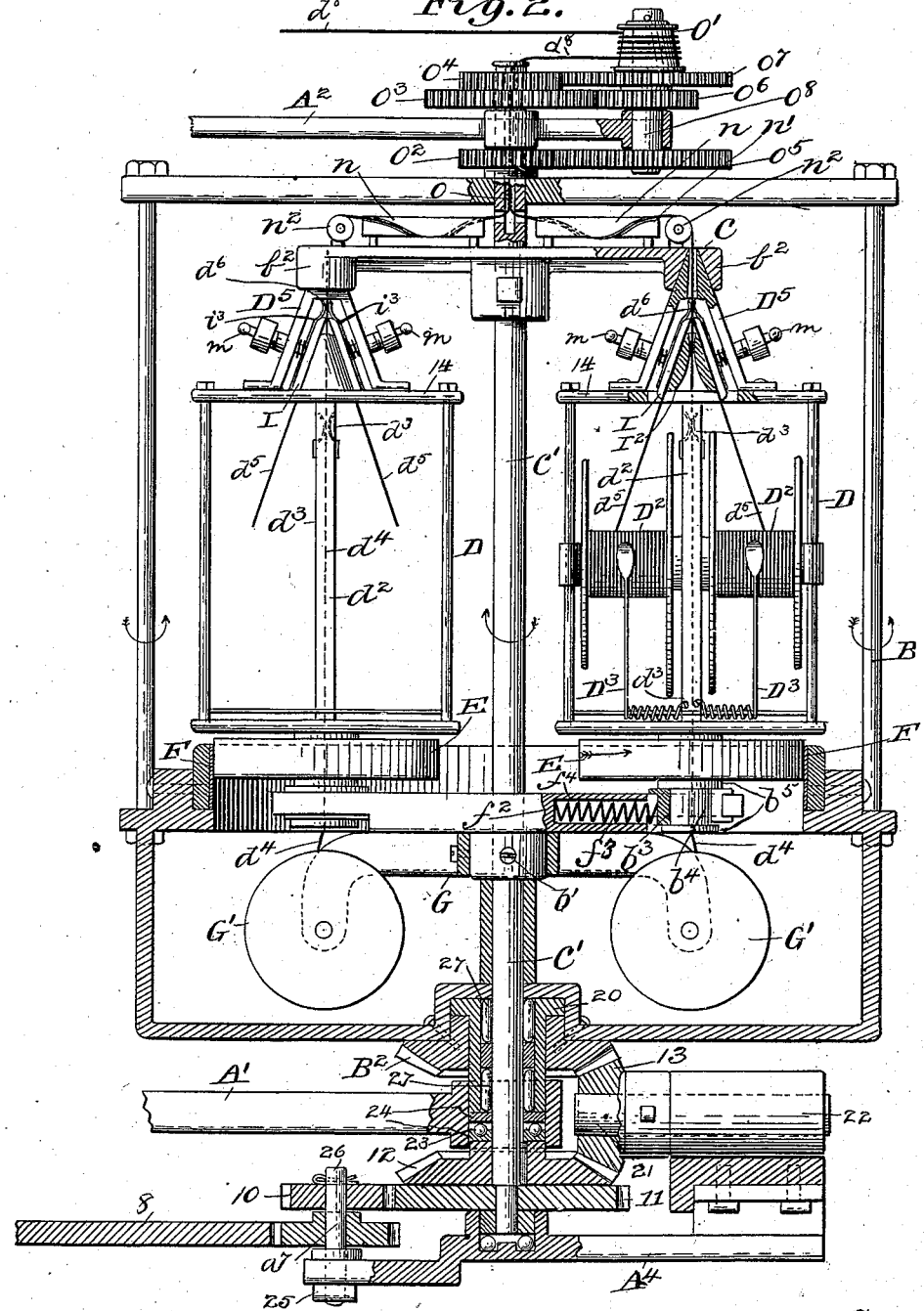

No. 723,806. PATENTED MAR. 31, 1903.
W. H. AVIS.
CORDAGE MACHINE.
APPLICATION FILED JAN. 19, 1899. RENEWED AUG. 30, 1902.
NO MODEL. 7 SHEETS—SHEET 3.
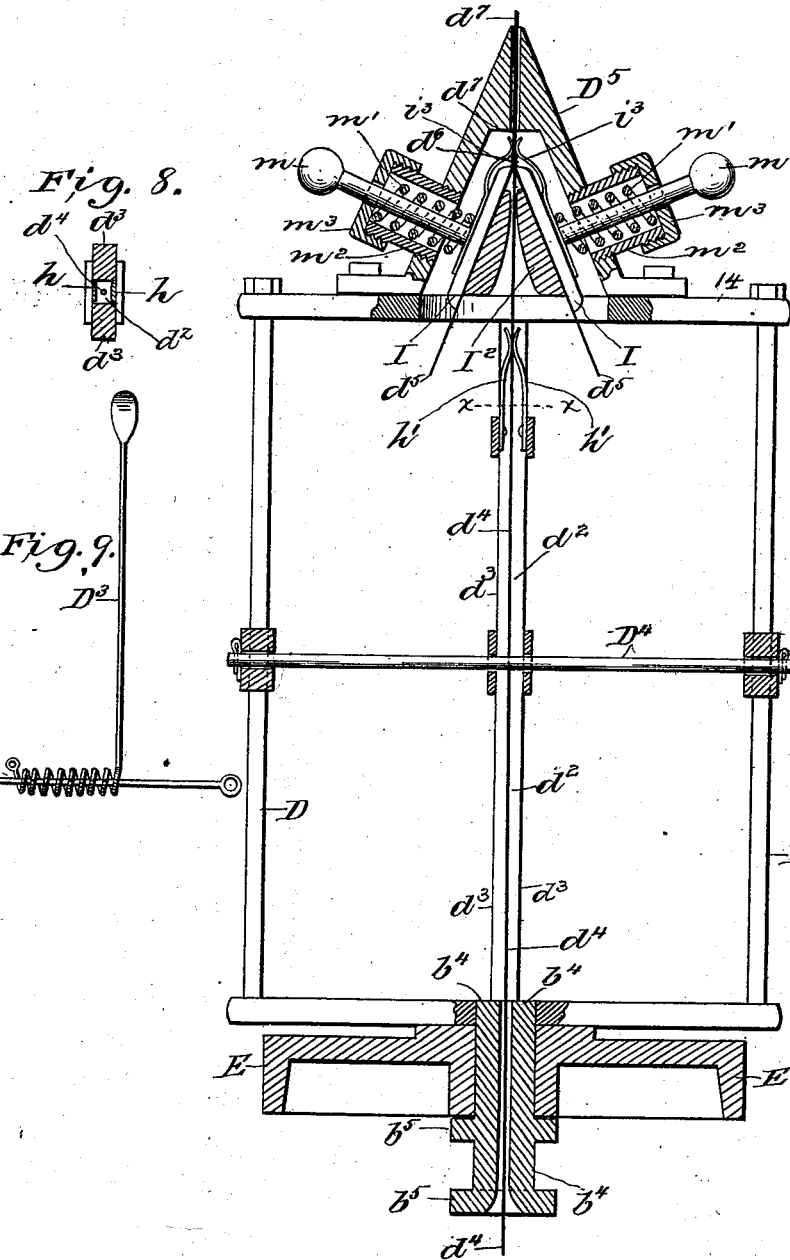
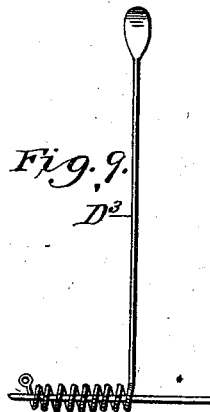
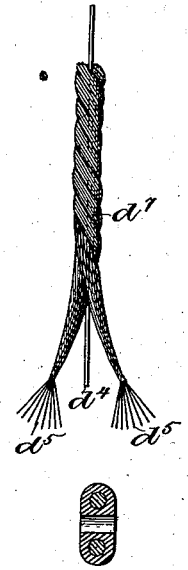

No. 723,806. PATENTED MAR. 31, 1903.
W. H. AVIS.
CORDAGE MACHINE.
APPLICATION FILED JAN. 19, 1899. RENEWED AUG. 30, 1902.
NO MODEL.
7 SHEETS—SHEET 4.
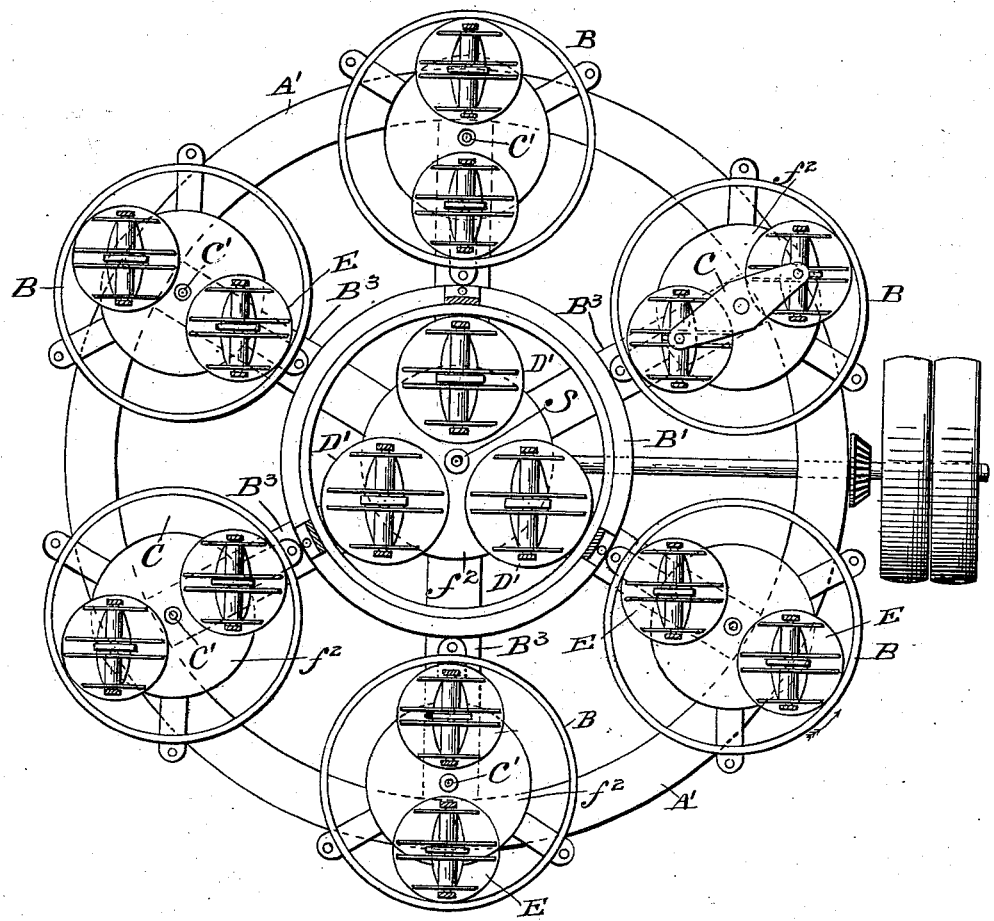
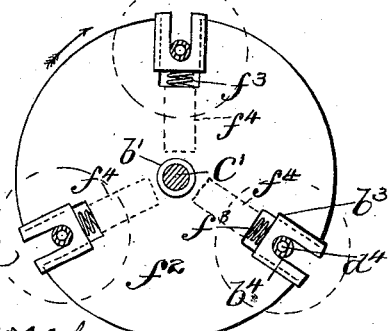

No. 723,806. PATENTED MAR. 31, 1903.
W. H. AVIS.
CORDAGE MACHINE.
APPLICATION FILED JAN. 19, 1899. RENEWED AUG. 30, 1902.
NO MODEL. 7 SHEETS—SHEET 6.

Witnesses
Jos. H. Blackwood
Albert B. Blackwood.

Inventor
Walter H. Avis
by J. H. Doolittle & Son
Attorneys

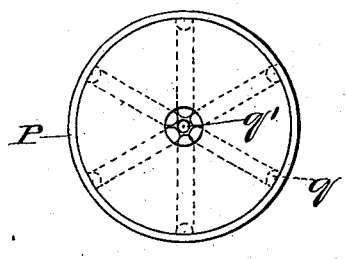
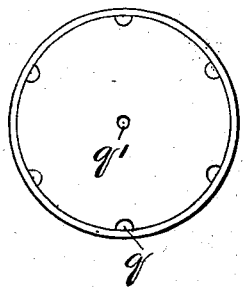
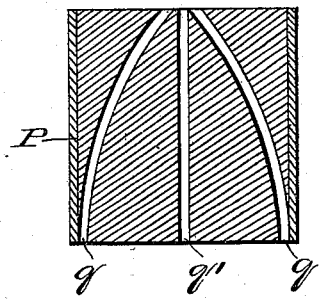
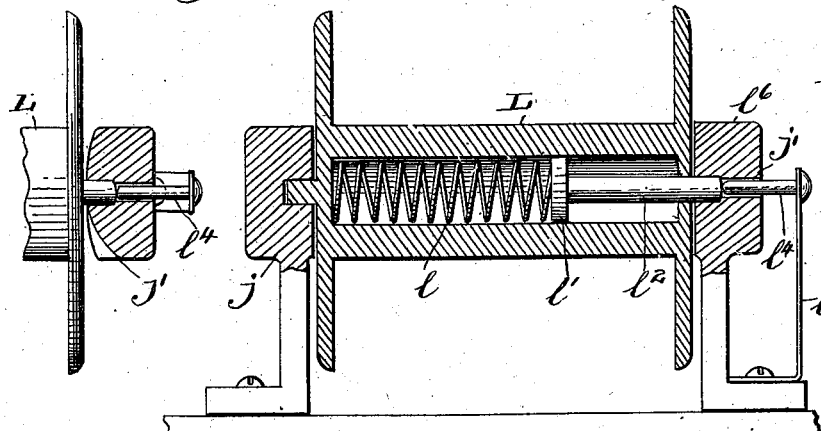
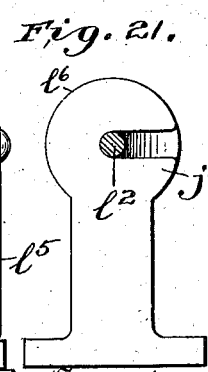

UNITED STATES PATENT OFFICE.

WALTER H. AVIS, OF HORSEHEADS, NEW YORK, ASSIGNOR TO ROBERT C. FISHER, OF TORONTO, CANADA.

CORDAGE-MACHINE.

SPECIFICATION forming part of Letters Patent No. 723,806, dated March 31, 1903.

Application filed January 19, 1899. Renewed August 30, 1902. Serial No. 121,698. (No model.)

*To all whom it may concern:*

Be it known that I, WALTER H. AVIS, a subject of the Queen of Great Britain, residing at Horseheads, in the county of Chemung, in the State of New York, have invented certain new and useful Improvements in Cordage-Machines, of which I do hereby declare the following to be a full, clear, and exact specification, such as will enable others skilled in the art to which such improvements relate to make and use the same.

My invention relates to an improved machine and method for making twine, cord, or rope, and especially a combined fibrous and wire cord, twine, or rope composed of strands formed of threads or yarns of fibrous material and a single untwisted wire upon which said threads or yarns are primarily laid substantially parallel thereto and then twisted thereon, at the same time doubling or folding the threads or yarns upon each other, thus forming a single strand, then doubling or folding such strands together to form a cord, and also in forming a core for said cord or rope consisting of a plurality of said strands primarily formed as above stated and then wound together, and a covering for said core consisting of the same primary strands laid around the core. This cord is illustrated in detail in Figure 22 of the accompanying drawings, and its construction will be further described hereinafter.

The functions to be performed by my machine in making such a cord consist, therefore, of feeding the yarns and wire, twisting the yarns with great force upon the wire, most compactly covering and insulating it, then doubling the strands, then forming the core, and then laying and cabling the outer strands upon the core. As these functions are performed simultaneously, the cord may be said to be made in one operation. My machine for making such article is illustrated in the accompanying drawings, in which—

Figure 6:
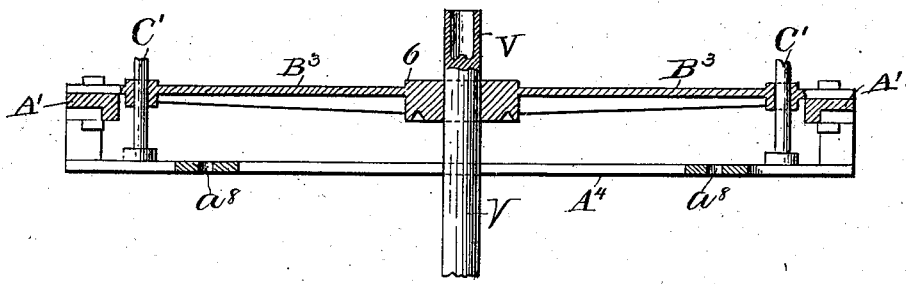
Figure 7:
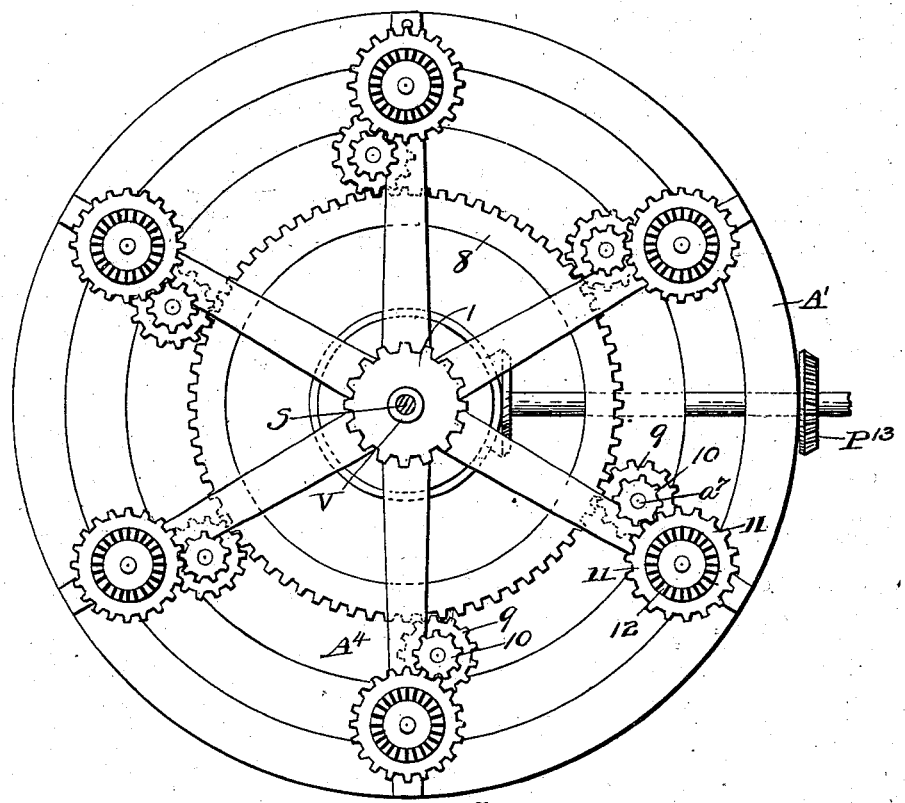
Figure 22:
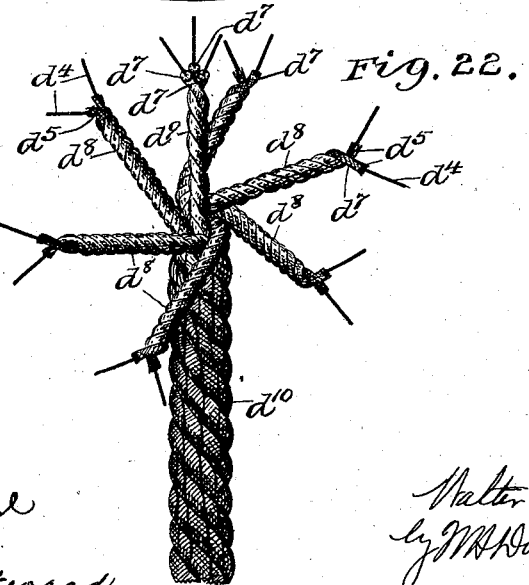

Fig. 1 is a central vertical section of the machine; Fig. 2, a similar view of a single ring-frame, inclosed fliers, and bobbins, and connected operating mechanism; Fig. 3, an elevation, partly in section, of flier-frame, supporting-roller, and compressing and nipping mechanism; Fig. 4, a top plan of a circular deck, central and outer ring-frames, fliers, and yarn-bobbins; Fig. 5, a plan of spider-quadrant-slotted frame with cog-gearing omitted; Fig. 6, a vertical section of the same; Fig. 7, a top plan of gear mechanism on line $x\ x$ of Fig. 1; Fig. 8, a section on line $x\ x$ of Fig. 3; Fig. 9, a detail of yarn-bobbin presser; Fig. 10, an enlarged detail showing the threads as they are laid parallel upon the wire in two straight flat layers or rows and as they are twisted into two strands and the strands as they are simultaneously twisted around a central wire; Fig. 11, a detail plan section of plate for supporting rods for removable horizontal bobbin-spindle; Fig. 12, a plan detail of roller tension device; Fig. 13, a detail plan of device for guiding and distributing the finished cord onto the reel; Fig. 14, a detail section of the carriage and clutch in said device; Fig. 15, a detail of cord smoothing and finishing box having a spiral groove; Figs. 16, 17, and 18, top, bottom, and sectional views of the "top;" Figs. 19, 20, and 21, details of a yarn-bobbin tension device; Fig. 22, a detail in elevation showing a specimen of the completed cord or rope produced by this machine; and Fig. 23, a detail of a capstan and wing-nut for changing the capstans.

Reference being had to the drawings, the framework consists of three separate circular decks or platforms A A' A² and a top supporting piece or frame A³. The main driving mechanism is located between the base A and the middle deck A', the bobbin and flier mechanism between the middle and upper decks A' and A², and the laying, stretching, cabling, and reeling mechanisms between the upper platform A² and the top or roof support A³.

Referring first to the flier and bobbin mechanisms by which the first steps in the operation of making the cord are given, B represents a ring-frame, within which flier-frames are placed and by which they are carried. There are six outer frames of this character and a central ring-frame B', and this central ring-frame is connected to a shaft C' of each ring-frame by arms B³, all as shown in Figs. 1, 4, 5, and 6. Within each outer ring-frame B are two fliers D D, and within the central ring-frame B' there are placed three fliers D', making in all fifteen flier-frames and seven ring-frames. Each set of fliers is connected with a rotary head C. Each flier-frame carries two twin bobbins $D^2 D^2$, wound with yarns $d^5$, mounted on a removable horizontal spindle $D^4$, Fig. 3, and separated by a channel $d^2$, formed by two uprights $d^3$, fixed to hub $b^4$. At its center each rotary head C is keyed to a shaft $C'$, which extends down between the fliers and to which is keyed a bracket G, carrying wire bobbins $G'$. A wire $d^1$ passes up from each bobbin $G'$ through the channel $d^2$. The heads C and bobbins $G'$ are rotated by shaft $C'$ in the same direction by means hereinafter described. My invention, however, is not restricted to the employment of the precise number of ring-frames, fliers, rotary heads, and bobbins herein shown, as the same may be varied to conform to the employment of a greater or less number of threads, yarns, and strands of fiber and wire, as may be desired in the making of various sizes of cord and rope. The operations of forming the cord in the order and in the manner hereinafter described are essential.

Although in order to render the drawings herein clear a single thread only is shown drawn from each of the bobbins, yet in practice in making a cord, rope, or twine herein shown and a machine of the character herein illustrated six yarns of fibrous material are drawn from each of the twin bobbins $D^2$ and twisted on one thread of wire from a bobbin $G'$ to form a single strand.

Each of the yarn-bobbins $D'$ is provided with a spring presser-arm $D^3$ (see Fig. 9) in one piece, the lower end of which terminates in a coiled spring on a rod near the bottom of the flier-frame and the upper end of which terminates in a spoon-shaped head, the function of which is to press upon the yarn and prevent any undue slack or misadjustment thereof as the same is fed out.

Each flier-frame is connected to the rotary head C by means of a conical bracket $D^5$, secured to the top of the flier-frame and adapted to fit so as to turn in a correspondingly-shaped recess in a boss $b^2$ of the rotary head. As will hereinafter be seen, the fliers rotate in the rotary head C. Hence the loose connection between the two and the two adjacent bearing-surfaces may be lubricated by any suitable means. To a short hollow shaft or hub $b^4$, fixed in disk $f^2$ at the bottom of each flier-frame, is secured to turn loosely thereon a roller E, fixed to flier-frame D, which roller in turn bears against a ring F, secured to the inner part of the ring-frame B. The rings are to drive the rollers E and fliers by frictional contact at a greater speed than the rotary head C by speed-gearing of the driving mechanism hereinafter described, and the rollers aid in guiding and maintaining the fliers and bobbins in proper position for doing the work of twisting the yarns upon a wire. Each of the outer ring-frames B is hung on the shaft $C'$ and turns loosely upon it, and at the lower end of this ring-frame there is secured rigidly a bevel-gear $B^2$, connected with the main driving mechanism, as hereinafter described.

A spring tension device is employed for maintaining and automatically controlling the pressure of the rollers E against the rings F. This device (shown in Figs. 2 and 12) is composed of a disk $f^2$, having a hub $b'$, which is keyed to the shaft $C'$, and which disk carries the hub $b^4$, on which rollers E and flier-frames are mounted. Recesses $f^4$ are formed in this disk, and a spiral spring $f^3$ is placed in each recess. A bifurcated sliding block $b^3$ is placed in each recess, its forked ends embracing the short hollow shaft $b^4$ on which a roller E and a flier-frame are loosely mounted. One end, the inner end of spring $f^3$, bears against the closed end of a recess $f^4$, and the opposite end of the spring bears against the head of the forked block $b^3$. The rollers E are rotated by the rings F, as elsewhere described, and the action of the above-mentioned spring $f^3$ against the post $b^4$ holds the roller against the ring-frame through the intermediate bearing $b^3$. On the uprights $d^3$, forming the channel $d^2$, and within each flier-frame are secured two spring-nipper fingers $h'$ to nip the wire $d^4$ as it comes from its spools and prevent its twisting by the twisting action of the yarns, as hereinafter explained.

Within the conical bracket $D^3$, above referred to and as best shown in Fig. 3, are placed conical heads $I^2$ and two compressing-jaws I I, and to the back of each of these jaws are secured nipper-fingers $i^3$. The conical heads $I^2$ are cast on the top cross-piece 14 of flier-frame D and revolve with it. The jaws I are secured to push-rod $m$ and bear against the heads $I^2$, but are not secured to the latter, and the nipper-fingers $i^3$ are fastened at their lower ends to the jaws I, the rod $m$ passing through the same. Between the jaws I and the conical heads $I^2$ the yarn is flattened tape-like, conducted by the jaws to the wire and pressed against the wire, and the wire is additionally held straight by the jaws to prevent its twisting or distortion from a straight line when the yarns are applied thereto. The yarns $d^5$ pass up between the jaws I and the heads $I^2$ and are twisted onto the wire $d^1$ just above the jaws I at the point $d^6$. (See Fig. 3 and as also shown in Fig. 10.) The combined yarns and wire forming the single strand $d^7$, Figs. 10 and 22, is then nipped by the fingers $i^3$ to confine the twist of the yarns on the wire to the point near the compressing-jaws I and to prevent the twisting of the wire and yarn above that point by the action of the fliers. The pressure of the jaws I and the spring-nippers $i^3$ is controlled and regulated by means of the push-rods $m$, passing through box $m^2$ and impinging on the nippers and jaws. A spiral spring $m'$ surrounds the rod within the box, which is provided with a screw-cap $m^3$ and against which cap the spring bears, the opposite end of the spring bearing against the nippers and jaws. When the jaws and nippers are pushed in by the rods or released, the tension of the spring holds them in position, which tension is regulated by the adjustment of the screw-cap.

In regard to the action of the nipping-fingers and jaws upon the wire as above described it is added that the spools G', which carry the wire, being secured by brackets to the central shaft C', are simply carried around by said shaft in the same direction as the flier-frames and yarn-bobbins and have no independent motion of their own except an unwinding one to reel off the wire and that the gear capstan mechanism above the ring-frames B has the sole function on the wire of drawing it off. Hence the wire is drawn off its reels in a straight untwisted condition; but the strong twisting of the yarns upon the wire produced by the fliers and rollers E and their actuating mechanism and which rollers are hung directly over the wire-bobbins and rotate in an opposite direction to that in which the wire-reels are carried have a strong tendency to twist the wire, and this tendency is met and prevented by the nipper-fingers and jaws above described. These nipper-fingers and jaws, although carried by the flier-frames and in the same direction, yet have a slipping hold on the wire, at the same time such a hold as to prevent the formation of spiral folds on the wire by the twisting action of the yarns. The action of the fingers and jaws is not to oppose a contrary movement to the twisting action of the threads, but to hold the wire so straight and rigid longitudinally as to prevent kinks or spiral folds being formed therein by lateral twisting strain.

In place of the spindle $D^4$ and ordinary bobbin-spool each bobbin may be provided with a tension device (shown in detail in Figs. 19, 20, and 21) for holding the bobbin steady in and against its supports and preventing a too-free play of the yarn. The wire-spools may also be so provided. This device consists of the hollow body L of the spool, which is supported on standards $j$ $j'$ within the flier-frames. In the body L is a spiral spring $l$, abutting at one end against the end of L, while its opposite end is secured to the head $l'$ of a plunger-rod $l^2$. The rod $l^2$ abuts against a shoulder in one of the supporting-standards $j'$. A push-rod $l^4$, connected to an upright spring-plate $l^5$, is employed to push against the rod $l^2$ when it is desired to remove the spool from the standards. To facilitate this removal, the inner face of the standard $j'$ is beveled, as shown in Fig. 20, so that when the plunger-rod $l^2$ is pushed in its end will slide down the said beveled face and out of the box. On top of each rotary head C are fixed two grooved rods $n$, (shown in detail in Fig. 15,) one for each flier and each being provided with spiral groove $n'$, through which each single wired strand $d^7$ is carried from over pulley $n^2$ after it leaves the nipper-fingers $i^3$. The function of these grooved rods is to smooth, polish, and finish the strands before they are wound together. There are fifteen of these rods, one for each completed single strand. The two strands from the smoothing-rods are drawn into the hollow shaft C' and there wound together at the point $o$, Fig. 2. The two strands thus united form one double strand $d^8$, Fig. 22. The means used for this purpose will now be described. Above the deck $A^2$ and over the fliers is located the first drawing-capstan O'. The gearing for operating this capstan is a speed-reducing one driven from shaft C' and consisting of spurs $o^2$ $o^3$ $o^4$ on shaft C', engaging, respectively, with spurs $o^5$ $o^6$ $o^7$ on capstan-post $o^8$, which post has a bearing in the upper deck $A^2$. The gear $o^2$, fast on shaft C', drives the larger gear $o^5$, fast on spindle $o^8$. Gear $o^6$, fast on spindle $o^8$ and driven through said spindle by $o^5$, drives larger gear $o^3$, which is loose on shaft C'. Gear $o^4$ is coupled to $o^3$ and drives larger gear $o^7$, which is loose on spindle $o^8$. The capstan O' is fastened to gear $o^7$ and is driven by it. Speed is thus reduced from gear $o^2$ to $o^7$ at a rate, say, of one hundred revolutions at $o^2$ to twelve and one-half revolutions at $o^7$. The drawing faster or slower is accomplished by putting in larger or smaller capstans. By the operation of this mechanism the doubling of the strands together commences and is finished at $o$ and is effected by rotation of the shaft C'. The drawing of the yarn and wire from their bobbins and the doubled strands from the hollow part of the shaft is effected by the capstan.

The forming top and drawing and reeling mechanisms are placed over and supported on the upper deck $A^2$ and between it and the roof-piece $A^3$. P is the top, (shown in Figs 16, 17, and 18,) which is fixed in a frame on the deck $A^2$ and over the central ring-frame and fliers. It is provided with outer channels $q$ and a center channel $q'$. Just below the top and within the hollow portion of the central shaft S, is formed the core $d^9$, Fig. 22, consisting of three single strands $d^7$, formed by the three central fliers twisted together at that point. Through the top P are led this core and the double strands $d^8$ from the outer fliers, and at the point 5 just above the top is formed the completed cord $d^{10}$ by the winding of the strands $d^8$ upon the core $d^9$. Gear mechanism for the final operations of drawing, stretching, and reeling the completed cord are connected to a fixed hollow shaft $P^2$. Through this shaft proceeds the completed cord to capstans R R', the stretching-frame T, and finally to the reel $w^2$ at the top of the machine.

The means and method of the winding operation of the double strands on the core are as follows: The capstan R, Fig. 1, draws the cords $d^8$ from the capstans O', through the top P, and also the strands forming the core $d^9$ from the central revolving head C. The winding of the strands upon the core at the point 5 is effected by the bevel-gear P⁶, secured to circular plate R⁵, which supports the whole final winding and reeling mechanism. Bevel-gear P⁶ is mounted on stationary shaft or post P² and engages with and is driven by spur-gear P⁷ on horizontal shaft P⁸, carrying bevel-gear P⁹, meshing with bevel-gear P¹⁰ on top of vertical shaft P¹¹, which latter shaft is rotated through bevels P¹² P¹³, the latter keyed to the main horizontal driving-shaft P¹⁴ at the bottom of the machine. The shaft P² runs through the plate R⁵ and its sleeve, which are cast onto bevel P⁶, to plate $p^4$ on frame $p^5$, rising from the deck A². The shaft P², plate $p^4$, and frame $p^5$ are cast in one piece.

R is the first capstan around which the laid cord is drawn after it leaves the top, and from which it is passed around a capstan R', driven faster than R. The capstan R is driven at a speed reduced from bevel P⁶ and a less speed than capstan R', whereby a strong and tight lay will be imparted to the rope. The capstan R' is adapted to slide upon a post R³, which is provided with a spiral spring R², supporting said capstan, whereby the capstan is permitted to move up and down on the post, so as to draw the cord from capstan R and to hold it as it is wound upon the last reel at a uniform and proper tension.

W⁴ is a set-screw to fit the removable capstan to its support. As shown in Fig. 23, the set-screw is attached to a bolt $w^5$, passed through the center of the capstan. When a capstan is to be changed, the set-screw is removed from the bolt, the bolt withdrawn, inserted through another capstan, and the set-screw applied.

T is a stretching and reeling frame placed above the winding-capstans R and R' and supported from the ceiling or top support A³ by means of a yoke W', stepped in support A³. It is also connected to the shafts R³ R⁴, which rest in the bottom cross-plate R⁵, and by and between which rods and plate all the upper gearing for operating the stretching-frame and reel is carried. On top of the stretching-frame is carried the reel W², on which the completed cord is wound. The function of the stretching-frame is, first, to carry the cord along the reel W² as it is wound and to distribute it smoothly and freely thereon, and, second, to stretch the cord by the winding action of the reel, so as to keep the cord taut as it comes from the capstans and to thus lay the cord smoothly and tightly upon the reel. To this end the stretching-frame is provided with a rotary right and left hand screw-rod S², worked by a worm S³ on rotating shaft R⁴, which engages with a worm-wheel S⁴ on the screw-rod S². A reciprocating carriage S⁶ is hung on rods S⁸ in the stretcher-frame, to which is swiveled a forked clutch S⁵, the fingers of the clutch adapted to engage with the grooves in the rod S². The cord coming from capstan R' passes through a hole S⁷ in the carriage S⁶, and from thence around the reel W². As the rod S² rotates, the fingers of the sliding clutch continuously engage with one of the grooves and the carriage and the cord are carried along to one or the other end of the reel, and then the fingers engage with the other groove and the cord and carriage are carried back as the cord is wound upon the reel. The shaft of reel W² is driven by a band-and-pulley connection $w^3$ from the grooved shaft S². The frame T is provided with a standard T², which is hinged to T at 19 and which has at its upper end a bearing for the reel-rod T³. By this arrangement the standard T² is slipped off the rod T³ and turned down, which permits the reel W² to be removed from the rod T³ and be replaced by another one. The pulleys carrying the band $w^3$ are speeded sufficiently high to stretch the cord.

The spur-and-pinion gearing referred to above as carried by rods R³ and R⁴ and plate R⁵, actuated through bevel-gear P⁶, consists of large spur $t^3$, fast on rod R³, engaging with a smaller cog $t^6$, fast on sleeve of shaft P²; $t^5$, fast on shaft R⁴; $t^7$, fast on R³, meshing with intermediate spur $t^9$, loose on shaft P², and spur $t^8$, fast on shaft R⁴, meshing with spur $t^{10}$, loose on shaft P², and on gear $t^{10}$ is secured a frame $t^{11}$, on which the winding-capstan R is secured.

Referring now to the main driving mechanism at the lower part of the machine, it will be noticed that the central shaft S for driving the central fliers is stepped with roller-bearings in the top of the vertical driving-shaft V, which latter extends up through a hub 6, on which center the arms B³, carrying the central ring-frame B', and is supported at its lower end on ball-bearings within a box V', bolted to the base of the machine. The gear 1 being thus secured to shaft V, the central ring-frame is driven thereby. The central shaft S drives the three central fliers by means of spur-gearing now to be described. Just above the deck A' and keyed on the main shaft V is a spur-gear 1, which meshes with a smaller loose spur-gear 2 on post 7, fixed on one of the arms B³, and coupled to gear 2 on same post is larger loose gear 4. Gear 4 meshes with smaller spur-gear 3, fast on shaft S. The effect of this arrangement is to give the shaft S double the speed of shaft V. Below and connected to the circular deck A' is a quadrant-slotted guide-plate A⁴, (see Figs. 5 and 6,) and between this deck and plate are located a gearing for driving the fliers and ring-frames, a plan view of which is given in Fig. 7. This gearing consists of a large central spur 8, secured fast on shaft V, which engages with separate loose pinions 9, mounted, respectively, on posts $a^7$, which are stationary, but removably secured to quadrant-slotted guide A⁴. On the posts $a^7$ and over pinions 9 are secured running pinions 10, engaging with spurs 11, fast on flier-shafts C'. To the last-named shafts, just above spurs 11, are secured fast bevel-gears 12. Each gear 12 engages with vertical bevel 13, mounted loosely on pin 21 in fixed bracket 22. Gear 13 engages with horizontal bevel B², secured fast to ring-frame B, turning loosely on sleeve 20. Each sleeve 20 is loosely mounted with roller-bearings 27 on shaft C' and rests on ball-bearings 23, the balls 23 placed between loose collars 24 on shaft C'. Each post $a^7$ is provided at its lower end with a nut 25, which holds it fast in quadrant-slotted guide A⁴, and the pinion 10 is held in position on post $a^7$ by spring-key 26. By loosening nut 25 the post $a^7$ and the pinion 10 can be moved in slot $a^8$, Fig. 5, to disengage it from spur-gear 11, and then by removing spring-key 26 pinion 10 can be removed from its post and a larger pinion substituted to engage with pinion 11 for the purpose of increasing the speed of the fliers driven by shaft C' and of the ring-frame driven by the train of gearing 8, 9, 10, and 11 from the shaft V. Ball-bearings are placed between the rotating hub of the central spur 8 and the hub 6 of the arms B³. Keyed to the hub of gear 8 is the horizontal bevel-gear 18, meshing with vertical bevel 17 on end of horizontal shaft $P^{14}$. Both gear 8 and gear 18 are thus coupled together and secured fast to shaft V. The machine is driven from the shaft $P^{14}$ by any suitable power.

By the construction and operation of the parts as above described it will be seen that the first step in the construction of a cord by my machine is to carry the yarns or threads of fibrous material from the yarn-bobbins to the single wire. Preparatory to twisting the threads upon the wire they are brought in a position substantially parallel with the wire at the point where the yarns and the wire pass through compressing-jaws I I. The next act is to twist the threads coming from the yarn-bobbins onto the wire, which is performed by the action of the flier-frames and the twisting-rollers E, driven by the shaft C' and driven also at increased speed by the ring-frame B and rings F, the rings F turning in the same direction as the rollers E turn on their axes, but at the same time carried in a reverse direction to that of the flier-frames, which carry the rollers. The next step is to smooth and polish each wired strand, which is done by carrying them over pulleys $n^2$ and through the grooved rods. Then follows the folding of the two strands together. This is done by bringing them together from their opposite directions on revolving head C to the point $o$ in the hollow part of the shaft C' and by the action of shaft C' carrying around said revolving head. During these operations the tension and drawing action upon the strands has continued by means of the capstan-and-gear mechanism already described and which is provided for each set of fliers. By these means and operation a severe twist of the fibers upon the straight wire is had at or as near as possible at the point where the doubling of the strands commences, and all formation of knots or kinks is avoided. The wire by this process of winding the strands together is given a wave-like spiral turn, but is not torsionally twisted, because the only effect of the doubling or winding is to carry the strands around a common axis and not to twist the threads and wire of each strand separately about its own axis. Its molecular construction is thus not broken or weakened. Before the final completion of the cord the core is formed. This is accomplished by the three central fliers and bobbin mechanism already described, the central fliers, yarn and wire bobbins, and ring-frames and rollers, &c., being the same in construction and operation as the outer ones. The central fliers, bobbins, and rollers to form the core are actuated from the central shaft S, which is rotated by the gearing from the main shaft V, as above described. The three core-strands are led into the hollow upper part of the shaft S and there wound together and then drawn through the center channel of the central top P, the outer strands at the same time being conducted up through the outer channels of the top, and all the strands are laid spirally upon each other and the cord completed at the point 5 just above the top P.

The final step of reeling has already been described, as well as the mode of operation and the changing the capstans to adjust the draw of the strands and the construction and operation of the gears to adjust the twist and lay of the strands.

Although the several steps in the entire operation have been thus severally described, yet they are all taken at the same time and by one general single operation of the machine.

Having thus described my invention, what I claim is—

1. In a machine for making a combined fibrous and wire rope, cord or twine, in combination with a wire-carrier, means for carrying the fibrous threads, a winding mechanism for winding the said threads around the wire, and means for imparting a torsional twist to the threads at the same time that they are being wound upon the wire, a gripper for holding the wire against twist or bending while the threads are being wound and twisted thereon, a drawing mechanism, and means intermediate the thread wrapping and twisting mechanism and said drawing mechanism for limiting the twist of the threads to the point of application of the threads to the wire, whereby said twisting action will not be carried forward into the operation of completing the rope, cord or twine, substantially as described.

2. In a machine for making a combined fibrous and wire rope, cord or twine, in combination with a bobbin for wire, bobbins for the fibrous threads, revoluble fliers for said thread-bobbins, a ring-frame for rotating said fliers, and means for driving said ring-frame at a higher speed than the revoluble speed of the fliers, whereby a strong, hard torsional twist is put into the threads at the same time that they are wound around the wire, and means for limiting the effect of said twisting action to the point of application of the threads to the wire, whereby the twist will not be carried into the operation of completing the rope, cord, or twine, and a drawing mechanism on said rope, cord, or twine, substantially as described.

3. In a machine for making a combined fibrous and wire rope, cord, or twine, in combination with bobbins for threads of fibrous material, a bobbin for wire, means for winding said threads on said wire, to form a strand, means to impart a torsional twist to said threads as they are so wound, flattening-jaws for threads, a wire-gripping device for holding said wire straight and untwisted under the stress of the twist of said threads, drawing and doubling mechanisms, and means for limiting the application of said torsional twist to the point where the threads and wire are formed into a strand, whereby said twisting action will not be carried forward into the further steps of making the rope, substantially as described.

4. In a machine for making a combined fibrous and wire rope, cord or twine, in combination with a bobbin for wire, bobbins for threads of fibrous material, revoluble fliers for said thread-bobbins, a ring-frame for rotating said fliers, means for driving said ring-frame at a greater speed than the revoluble speed of the fliers, whereby a hard torsional twist will be given to the threads as they are wound on the wire, means for leading the fibrous threads for application to the wire in flat tape-like sections, a wire-gripping device for holding said wire straight and untwisted under the stress of the twist of said threads, and a drawing mechanism, substantially as described.

5. In a machine of the character described the combination of means for holding a wire in a straight and untwisted condition, means for twisting separate threads or yarns of fibrous material around said untwisted wire, thereby forming a single strand composed of an untwisted wire and said yarns twisted upon it, means for folding said single strands together to form a double strand or cord, means for winding upon each other several of said single strands to form a core, and means for winding said double strands or cords around said core to form a covering therefor, substantially as described.

6. In a machine of the character described, the combination with actuating means of a series of outer ring-frames and a central ring-frame, a series of outer flier-frames within and carried by said outer ring-frames, two or more flier-frames within said central ring-frame, twin yarn-bobbins mounted within each flier-frame, a rotary head loosely mounted on each set of fliers and to which the yarns are carried, a shaft for carrying said rotary head, said shaft extending down between said fliers, wire-bobbins attached to the lower end of said shaft, means to rotate said shaft whereby the rotary head and wire-bobbins are carried in the same direction, arms forming a vertical channel through said flier-frames and between said yarn-bobbins for conducting a wire to said rotary head, means to rotate said fliers in an opposite direction to said rotary heads and wire-bobbins, each of said ring-frames loosely mounted on the shaft of said rotary head, a gear rigidly secured to the lower end of said shaft, said gear connected to the main driving mechanism, means for guiding said yarns to the wire, means for holding wire straight while the yarns are twisted thereon by the movement of the fliers, and gear mechanism above said rotary heads connected to and driven by said central-ring-frame shaft for drawing said yarns and wire during the operation of twisting the yarns onto said wire, substantially as described.

7. In a machine of the character described, in combination with a flier-frame and its yarn and wire bobbins, arms forming a channel passing up through said flier-frame between the yarn-bobbins and through which a wire to be covered by the yarns is passed, and spring nipper-fingers secured to the opposite walls of said channel to nip the wire and prevent its twisting by the twisting action of the yarns thereon, substantially as described.

8. In a machine of the character described in combination with a flier-frame and its yarn and wire bobbins, a conical bracket secured to the top of the flier-frame, conical heads within said bracket also secured to the flier-frame, jaws secured to spring-controlled press-rods, said jaws adapted to press flat the yarns which are passed between them and the said heads, said jaws extended above the said heads and conducting the yarns to and pressing them and the wire together preparatory to the twisting of the yarns upon the wire, substantially as described.

9. In a machine of the character described in combination with a flier-frame, its yarn and wire bobbins, a conical bracket secured to the top of the flier-frame, conical heads within said bracket also secured to the flier-frame, spring-controlled pressing-jaws bearing against said heads, and between which jaws and heads the yarns are pressed and passed and by which the yarns are conducted to the wire, and spring nipper-fingers connected to said jaws and adapted to nip the wire and yarns after the latter are twisted onto the wire and to prevent the further twisting of the wire and yarns above said fingers, substantially as described.

10. In a vertical machine of the character described the main framework of the machine consisting of three circular decks or platforms A, A', A² and a top or roof support A³ in combination with the main driving mechanism consisting of gearing and the main vertical and horizontal driving-shafts mounted within and on the first and second decks A, A' a series of outer ring-frames and a central ring-frame and their supporting and operating shafts, connected with said driving mechanism and mounted between the said central decks A' and A², said outer ring-frames each carrying within it a set of flier-frames, and said central ring-frame carrying two or more flier-frames, yarn-bobbins within each of said flier-frames and wire-bobbins below the same, guiding and speed rollers at the bottom of said flier-frames in contact with said ring-frames, rotary heads and smoothing and polishing rods on said heads, and on said upper middle deck A² and between it and a supporting-roof A³ the top for forming the completed cord, drawing, stretching and reeling mechanisms, said upper drawing, stretching and reeling mechanisms connected with gearing and shafting driven from the base of the machine, whereby in the central part of the machine-core strands of combined yarn and wire are formed, and a central core composed of several of such strands is formed, and above the upper deck the forming of the completed cord is had by the winding of the outer strands upon the core, and the final stretching and reeling of the cord completed, substantially as described.

11. In a machine of the character described, a device for holding a bobbin steady in and against its supports and preventing a too free play of the yarns or wire, consisting of a hollow bobbin-spool, a frame carrying standards on which said spool is mounted, a spiral spring within said spool to press the spool against the standards, a plunger-rod in the hollow space for compressing the spring, said rod projecting out of said spool against a standard, a push-rod adapted to contact with said compressing-rod, and a vertical spring-plate outside of said standard to which said push-rod is connected, whereby the spool may be removed from its standards by pushing the plunger-rod within the spool, substantially as described.

12. In a machine of the character described the combination with the main driving mechanism, the flier-frames and ring-frames and means for driving the fliers and ring-frames, of a circular deck or platform $A^4$, provided with quadrant-slots $a^8$, posts $a^7$ removably fixed in said slots by nuts, a loose pinion on said post engaging with a fixed spur on the main driving-shaft, a running pinion removably held on said post engaging with a fixed spur on the flier-frame shaft, whereby by loosening the said post the same may be moved in said slot to disengage its said running pinion from the flier-frame pinion, and a larger pinion substituted therefor, for the purpose of increasing the speed of the flier-frame and ring-frame, substantially as described.

In testimony whereof I have hereunto set my hand and affixed my signature in the presence of two witnesses.

WALTER H. AVIS.

Witnesses:
I. B. COLEMAN,
E. HORTON.